United States Patent
Erikson et al.

[11] Patent Number: 6,041,671
[45] Date of Patent: Mar. 28, 2000

[54] MINIATURE ANTI-BACKLASH NUT ASSEMBLY

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 09/090,370

[22] Filed: Jun. 4, 1998

[51] Int. Cl.[7] .................................................. F16H 55/18
[52] U.S. Cl. .............................. 74/441; 411/231; 411/240
[58] Field of Search .............................. 74/441; 411/231, 411/237, 239, 240

[56] References Cited

U.S. PATENT DOCUMENTS

| | | | |
|---|---|---|---|
| Re. 31,713 | 10/1984 | Erikson et al. | 74/441 |
| Re. 32,433 | 6/1987 | Erikson et al. | 74/441 |
| 2,389,035 | 11/1945 | Feeney | 74/441 |
| 2,919,596 | 1/1960 | Kuehl | 74/441 |
| 3,382,731 | 5/1968 | Whicker | 74/441 X |
| 4,005,493 | 1/1977 | Morgan | 74/441 X |
| 4,131,031 | 12/1978 | Erikson et al. | 74/441 |
| 4,210,033 | 7/1980 | Erikson et al. | 74/424.8 |
| 4,249,426 | 2/1981 | Erikson et al. | 74/441 |
| 4,353,264 | 10/1982 | Erikson et al. | 74/441 |
| 4,449,417 | 5/1984 | Sasaki | 74/409 |
| 4,566,345 | 1/1986 | Erikson et al. | 74/89.15 |
| 4,872,795 | 10/1989 | Davis | 74/441 X |
| 4,974,464 | 12/1990 | Erikson et al. | 74/89.15 |
| 5,252,015 | 10/1993 | Davis | 411/231 |
| 5,601,372 | 2/1997 | Erikson et al. | 384/278 |
| 5,732,596 | 3/1998 | Erikson et al. | 74/441 |

*Primary Examiner*—Allan D. Herrmann
*Attorney, Agent, or Firm*—Hamilton, Brook, Smith & Reynolds, P.C.

[57] ABSTRACT

An anti-backlash mechanism is described in the form of a pair of nuts or nut halves with internal threads complementary to the threads on a lead screw. The mechanism is traslated by rotation of the screw. One of the nuts has an outer cantilevered wall with inner gear teeth which engage outer gear teeth on the other nut. Rotation of one nut with respect to the other nut tightens or loosens an abutting frictional rotation-opposing resistance of an elastomeric washer compressed between the two nuts. The compressed washer exerts a bias force against the nuts opposing axial forces exerted by the lead screw against the flanks of the nut threads.

24 Claims, 1 Drawing Sheet

MINIATURE ANTI-BACKLASH NUT ASSEMBLY

BACKGROUND OF THE INVENTION

Many modern day machines, from data printers to positioning devices to robots and the like, require a mechanism for converting rotary motion to linear motion at relatively high speeds and with considerable accuracy. Today's standards require such equipment to have good positional repeatability, reliability and long life. A typical device for accomplishing these objectives is an anti-backlash nut threaded onto a lead screw that traverses back and forth i.e. undergoes bidirectional translation as the screw is rotated in one direction or the other.

One such mechanism is disclosed in U.S. Pat. No. 4,131,031 (incorporated herein in its entirety by reference) which includes an anti-backlash nut assembly which translates along a lead screw in response to the rotation of the screw. The nut itself is divided into two nuts or halves, both of which have internal threads complementary to the thread on the screw. The two portions or halves of the nut are secured in a radial direction on the screw, by a spacer in the form of a tube or collar. A compression spring continuously applies an axial biasing force in the longitudinal direction of the screw, forcing the nut halves apart, so that the nut threads bear against the threads in the screw in opposite directions to minimize or eliminate backlash.

While anti-backlash nuts made in accordance with the above-identified patent have proven satisfactory, they are somewhat limited because of the spring employed. The spring biases the nut halves apart to urge thread flanges against opposite thread flanks of the lead screw. If a load is imparted to one of the nut halves without the spring in place, the opposite nut half translates with respect to the first nut half because there is nothing to restrain it. The anti-backlash feature of this prior art invention is dependent upon the axial force of the spring itself. Since the load is transferred through the spring, a spring of high compressibility or stiffness causes a large frictional force and, thus, loss of efficiency. Conversely, too weak a spring does not adequately reduce backlash. Thus, the anti-backlash aspect of the '031 patent is only as good as the force of the spring.

Another such mechanism is described in U.S. Pat. No. 4,353,264 (incorporated herein in its entirety by reference) in which an anti-backlash nut assembly also undergoes translational movement longitudinally along a screw in response to rotational movement of the screw. The mechanism of the '264 patent employs a nut which is split into two nut halves which are internally threaded with the same thread and hand as the screw. The two nut halves are retained in the radial direction by a coaxial cylinder surrounding portions of the nut halves. A spacer is mounted on the retainer between the surfaces of the nut halves and is rotationally biased by a torsion spring against at least one of the surfaces to close any gap which may occur by wear over time between the thread of the screw and the thread of the nut. In another embodiment a slightly elastomeric washer is provided between the spacer and a nut halve to maintain torque consistency over shaft length. Thus, backlash is minimized by employing a number of mechanical elements.

An anti-backlash mechanism is also disclosed in U.S. Pat. No. 5,732,596 (incorporated herein in its entirety by reference). In this invention two nut halves are also joined together by a helical torsion spring which induces relative rotation of the nut halves in opposite directions toward a closed abutting position. Also, a high friction elastomeric washer is inserted between opposite faces of two nut halves to limit the ability of the nut halves to rotate relative to one another; i.e. in opposite directions and thus separate from one another when an axial force is applied.

Despite the commercial success of the inventions embodied in the above referenced patents, a need exists for a smaller, more compact, easy to assemble, anti-backlash mechanism with fewer parts and which also occupies less space. This need is due in part to the ever increasing movement toward micro-miniaturization of instruments and the attendant need to reduce the load induced on the miniature motors which rotate the drive screws in delicate but precise miniature instruments.

SUMMARY OF THE INVENTION

Note: In a generic sense, the terms "thread" and "gear" may sometimes be used interchangeably. However, for simplicity and clarity, as used herein; the term "thread(s)" refers to helical or spiral ridges or the like on the nuts and lead screw and "gear(s)" or gear teeth refer to the teeth on the cantilevered wall of one of the nuts which mesh with the teeth on the other nut.

In accordance with the invention, an anti-backlash nut assembly is provided with three unitary parts; two nuts and an elastomeric washer. The first part is a nut which has a first internal thread on an inner bore and gear teeth on a cantilevered wall of a split outer bore of the first nut. The first nut is coupled to a second nut which has an internal thread on an inner bore and external or outer gear teeth on the periphery of the second nut. The internal threads of each nut are adapted to engage complementary external threads on a lead or drive screw which when rotated causes transverse linear movement of the two parts or nuts.

The inner diameter of the outer bore of the first nut is sufficient to accommodate the periphery of the second nut permitting the outer gear teeth of the second nut to be engaged with the inner gear teeth of the first nut.

In a preferred embodiment, the two nuts are tied or held together by a third part, comprising an elastomeric frictional member which resists rotation of one nut with respect to the other nut. The extent of the resistance is initially manually adjustable by rotating one nut in an appropriate direction with respect to the other nut such that the cantilevered wall of the outer bore of the first nut is momentarily radially deflected causing disengagement between the respective gear teeth of the first and second nut. Depending upon which direction the nuts are rotated the frictional resistance between the two nuts or inner and outer nut halves can be increased or decreased. Once the manual rotation ceases the resistance is fixed by the detent action which occurs when the teeth of the inner and outer nut halves are re-engaged.

In a first preferred embodiment an elastomeric friction washer is used between the two nut halves in intimate contact with the mating nut halves. The elastomeric washer performs; the dual functions of both a spring mechanism and a frictional mechanism. Compression of the washer by rotation of the nut halves toward one another stores up energy in the washer, which is used as a biasing force in opposing axial forces exerted on the nut halves by lead screw rotation tending to separate them.

The ratcheting action of the mechanism maintains the relative position of each nut with respect to the other. Thus, as wear occurs on thread flanks, each nut will be restrained from rotation and subsequent separation from the other.

Some axial translation of the two nuts will occur with thread wear. The extent of translation will vary with the amount of rotational torque initially supplied at assembly, as well as the durometer of the elastomeric material used for the washer.

An anti-backlash system is thus created which allows for very easy assembly, a minimum number of parts, wear compensation, and the ability to obtain these functions in a minimal amount of space.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
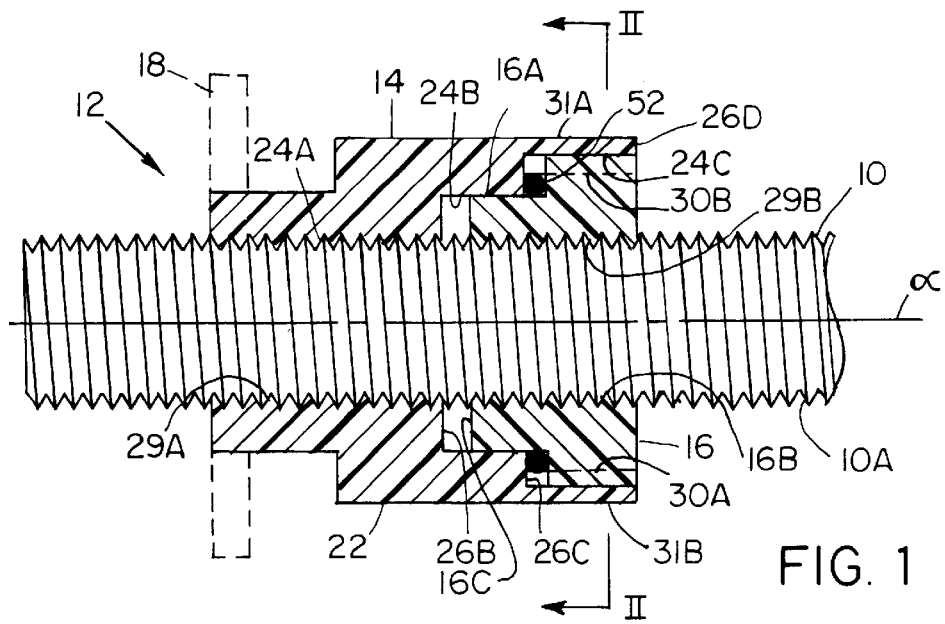
FIG. 1 is a side elevation view of an anti-backlash nut assembly on a lead screw illustrating the invention.
Figure 2:
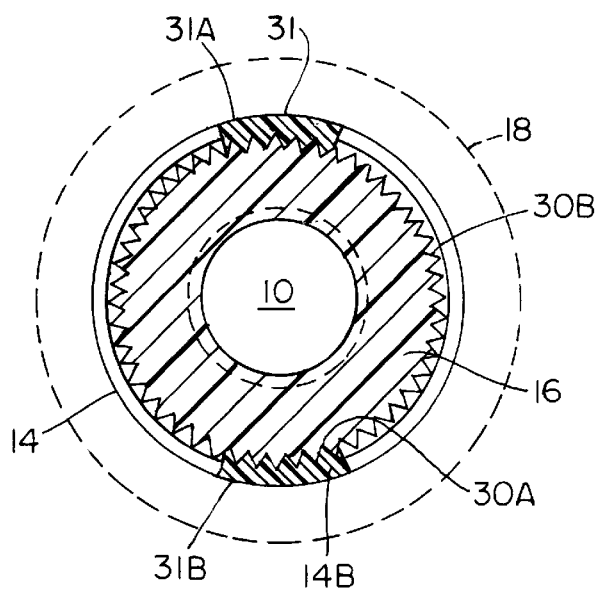
FIG. 2 is a sectional view taken along lines II—II of FIG. 1.
Figure 3:
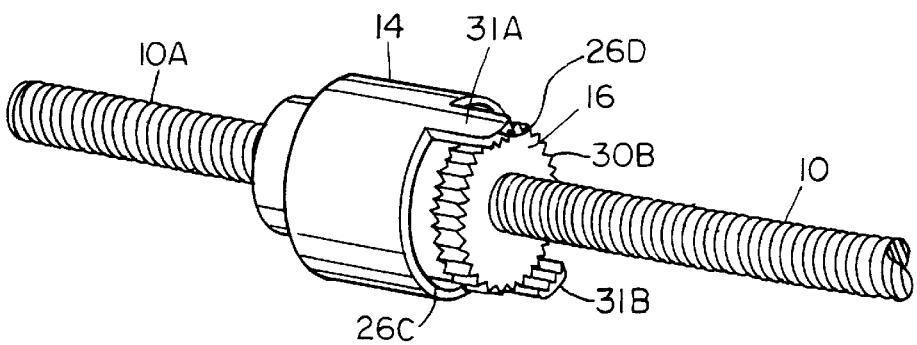
FIG. 3 is a perspective view of an anti-backlash nut assembly of the invention shown mounted on a lead screw.

Referring to FIGS. 1–3, an anti-backlash nut assembly embodying the invention will be described. A right hand threaded lead screw 10 is shown with an anti-backlash nut assembly generally designated 12 mounted thereon. The nut assembly 12 comprises a first or left nut 14 and a second or right nut 16. [NOTE: For consistency and simplicity the nuts are referred to herein as separate nuts rather than nut halves.] The assembly 12 may be driven in bidirectional translation, back and forth along the screw 10 by rotating the screw. The left nut 14 has an optional face plate 18 (shown in dotted lines) for joining the nut assembly to a load (not shown) to be reciprocated back and forth by the lead screw. A cylindrical portion 22 of nut 14 projects from the faceplate 18. First, second, and third concentric circular bores labeled respectively 24A, 24B and 24C are formed in portion 22. Bore 24A extends through the longitudinal length of nut 14. Bore 24B terminates in a circular or ring-shaped face 26B which is formed at right angles to the axis α of the lead screw 10. The third circular bore 24C is also formed in the cylindrical member 22 and terminates at wall 26C also at right angles to axis α.

The inner diameter of a through bore 16B on the nut 16 and bore 24A of the cylindrical portion 22 of nut 14 are formed with internal screw threads 29A and 29B respectively extending along the axis α. They are the same size and hand as the threads 10A on the lead screw 10.

The third bore 24C on the cylindrical member 22 extends from right angle flat wall 26C to endwall 26D and is provided with gear teeth 30A which mate with or engage complementary teeth 30B on the outer diameter of nut 16. It should be noted that the cylindrical wall 31 of bore 24C is split into at least two sections, between walls 26C and 26D, a first or upper section 31A and a second or lower section 31B. The two walls 31A and 31B are cantilevered from the main body of cylindrical portion 22. The walls may therefore be deflected or ratcheted up or down as the teeth 30B on nut 16 are rotated with respect to the teeth 30A on the cantilevered extensions 31A and 31B of nut 14.

Concurrent with this ratcheting action, and depending upon the direction of rotation, as the two nuts 16 and 14 are rotated with respect to one another, a high friction elastomeric washer 52 is compressed or allowed to expand between face 26C on bore 24C and abutting wall face 16C on nut 16. Washer 52 encircles the outer diameter of wall 16A of nut 16 and performs a dual function. First, it locks or ties the two nuts together by resisting rotation of one nut with respect to the other. The extent of this frictional resistance is mainly determined by how tightly the outer nut 14 is ratcheted against the inner nut 16 using the above described ratcheting mechanism.

Secondly, as the high-friction elastomeric washer 52 is compressed by the ratcheting action a bias or axial spring force is created in the washer which maintains intimate contact between the engaged thread flanks of the two nuts with the threads of the lead screw 10. In this way backlash is eliminated or minimized.

Over time, minute wear occurs at the flank contact areas of the nuts. This is due to the torsion forces acting on the nuts constantly urging them against the flanks of the screw thread, as well as the wear associated with constant use of the lead screw and nuts in their usual mode of operation. If upon maintenance inspection it is found that gaps appear at the contact areas causing backlash, the force applied to the elastomeric washer 52 can be adjusted simply by manually rotating the nuts using the ratchet mechanism to minimize the gap and hence the backlash.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims. For example, while the invention has been described using a distinct unitary elastomeric member between the two nuts to impart a frictional rotational resistance between the two, it would now be recognized by those skilled in the art that other well known equivalents such as frictional coatings or serrations on opposed nut faces may be substituted in place thereof. Also, other biasing mechanisms, such as, torsion springs, spring washers or Bellville washers or the like, may well be used to provide a spring force opposing the axial forces exerted by the lead screw on the flanks of the nut threads. The nuts are preferably formed of inert, durable materials such as a metal or plastic. Steel, cast bronze, or thermo-plastic molded polymers are preferred materials and self-lubricating polymer compositions are highly preferred for components which contact screw threads. Preferably, the gear teeth are formed with equal graduations so that the nuts can be rotated by one tooth graduation when adjusting the biasing force applied by the washer 52.

What is claimed is:

1. An anti-backlash mechanism formed of a pair of nuts with internal threads on inner bores of the nuts, which threads are complementary to threads on a lead screw upon which the nuts are longitudinally translatable in an axial direction by rotation of the lead screw and wherein the rotational position of one nut is fixed with respect to the other nut by engagement of gear teeth on each nut and wherein the nuts have faces formed transverse the axial direction and the mechanism includes a bias element interposed between the nut faces to provide a bias force opposing any axial forces imparted on faces of the nuts by rotation of the lead screw and wherein the bias element is a frictional member which also resists radial rotation of the nuts.

2. The mechanism of claim 1 wherein the frictional member comprises an elastomeric washer which is compressible between the two nut faces by disengaging the gear teeth and rotating one nut on the lead screw closer to the other nut.

3. The mechanism of claim 1 wherein the gear teeth can be disengaged and disengagement is facilitated by forming the gear teeth on a cantilevered wall of one of the nuts; such that the gear teeth on said one of the nuts can be deflected to permit rotation of the other nut.

4. The mechanism of claim 2 wherein disengagement is facilitated by forming the gear teeth on a cantilevered wall of one of the nuts; such that the gear teeth on said one of the nuts can be deflected to permit rotation of the other nut.

5. The mechanism of claim 4 wherein disengagement permits rotation of one of the nuts in either direction to increase or decrease the bias force of the bias element.

6. In combination:
   a) a first nut having a first internal thread on an inner bore and radially displaceable gear teeth;
   b) a second nut having an internal thread on an inner bore and radially fixed gear teeth and wherein said fixed teeth engage the radially displaceable teeth on the first nut; and
   c) a member in axially abutting relationship between a face of the first nut and a face of the second nut to provide an elastomeric frictional resistance opposing rotation of one nut away from the other nut as well as spring bias in an axial direction.

7. The combination of claim 6 in which the inner threads of the first and second nuts are formed coaxial to one another for engagement with a complementary thread on a lead screw.

8. The combination of claim 7 wherein the rotation opposing resistance between the first and second nuts is adjustable by manually rotating one nut with respect to the other nut to disengage the gear teeth and upon such rotation the member is either compressed or allowed to expand to increase or decrease an axial force exerted by said member which opposes any axial force exerted on the faces of the nuts by rotation of the lead screw.

9. In combination:
   a) a first nut having a first internal thread on an inner bore and radially displaceable gear teeth on an outer bore;
   b) a second nut having an internal thread on an inner bore and gear teeth on an outer periphery and wherein said gear teeth on said outer periphery engage the radially displaceable gear teeth on the outer bore of the first nut to fix the rotational position of the nuts with respect to each other; and
   c) a member in axially abutting relationship between the first and second nut to provide an elastomeric frictional resistance opposing rotation of one nut away from the other nut as well as spring bias in an axial direction.

10. The combination of claim 9 wherein the rotation opposing resistance between the first and second nuts is adjustable by manually rotating one nut with respect to the other nut.

11. The combination of claim 10 wherein upon rotation of the nuts with respect to one another gear teeth on the first nut temporarily disengages from the gear teeth on the second nut producing a ratcheting action.

12. The combination of claim 9 in which the inner threads of the first and second nuts are formed coaxial to one another for engagement with a complementary thread on a lead screw.

13. The combination of claim 9 wherein the teeth on the outer bore of the first nut are disposed on a wall of the outer bore which extends longitudinally from a cylindrical portion of the first nut; which wall at least partially encircles the outer periphery of the second nut to enable the internal teeth on the outer bore to engage the outer teeth on the second nut.

14. The combination of claim 13 wherein the wall of the outer bore is split into at least two portions to enhance the ability of the wall to deflect as one nut is rotated with respect to the other.

15. The combination of claim 13 wherein the teeth are formed of teeth having equal graduations such that the nuts can be moved closer or farther apart by one tooth graduation.

16. The combination of claim 15 wherein the closer the nuts are moved together the greater the force that is applied to the member to increase the resistance opposing rotation.

17. The combination of claim 9 wherein the member is an elastomeric spacer.

18. The combination of claim 9 wherein the teeth on the outer bore are formed on a cantilevered wall.

19. An anti-backlash mechanism formed of a pair of nuts with internal threads on inner bores of the nuts, which threads are complementary to threads on a lead screw upon which the nuts are longitudinally translatable in an axial direction by rotation of the lead screw and wherein the rotational position of one nut is fixed with respect to the other nut by engagement of gear teeth on each nut and wherein the nuts have faces formed transverse the axial direction and the mechanism includes a bias element interposed between the nut faces to provide a bias force opposing any axial forces imparted on faces of the nuts by rotation of the lead screw.

20. In combination:
   a) a first nut having a first internal thread on an inner bore and radially displaceable gear teeth;
   b) a second nut having an internal thread on an inner bore and radially fixed gear teeth and wherein said fixed teeth engage the radially displaceable teeth on the first nut; and
   c) a member in axially abutting relationship between a face of the first nut and a face of the second nut to provide an elastomeric frictional resistance opposing rotation of one nut away from the other nut.

21. A method for minimizing backlash between a lead screw and a load comprising the steps of:
   a) screwing a first nut onto a thread on the lead screw using an internal thread on an inner bore of the first nut;
   b) screwing a second nut onto the thread on the lead screw using an internal thread on an inner bore of a second nut;
   c) engaging gear teeth on the first and second nuts to fix the rotational position of one nut with respect to the other; and
   d) disposing a member in axially abutting relationship between the first and second nuts to provide an elastomeric frictional resistance opposing rotation of one nut away from the other nut.

22. The method of claim 21 including the step of adjusting the rotation opposing resistance between the first and second nuts by rotating one nut with respect to the other nut.

23. The method of claim 22 wherein rotation of the nuts with respect to one another causes the teeth on one of the nuts to temporarily disengage from the teeth on the second nut producing a ratcheting action.

24. The method of claim 23 wherein one of the teeth is formed on a cantilevered wall which is split into at least two portions to enhance the ability of the wall to deflect as one nut is rotated with respect to the other.

* * * * *